United States Patent

[11] 3,624,544

[72] Inventors Anthony J. De Maria
West Hartford;
David A. Stetser, Jr., Manchester; Hans A. Heynau, Wapping, all of Conn.
[21] Appl. No. 536,898
[22] Filed Mar. 23, 1966
[45] Patented Nov. 30, 1971
[73] Assignee United Aircraft Corporation
East Hartford, Conn.

[54] SELF MODE-LOCKING OF LASERS USING DYES
5 Claims, 6 Drawing Figs.
[52] U.S. Cl. .................................................. 331/94.5,
332/7.51
[51] Int. Cl. .................................................. H01s 3/11
[50] Field of Search .......................................... 331/94.5;
330/4.3; 332/7.51; 350/150, 160, 161

[56] References Cited
OTHER REFERENCES

De Maria, J. Appl. Phys. 34, Oct. 1963, pp. 2984– 2988 (331– 94.5)

De Maria et al., J. Appl. Phys. 34, March 1963, pp. 453– 456 (331– 94.5)

Deutsch, Appl. Phys. Letters, 7, Aug. 15, 1965, pp. 80– 82 (331– 94.5)

Mocker et al., Appl. Phys. Letters, 7, 15 Nov. 1965, pp. 270– 273 (331– 94.5)

Primary Examiner—Roy Lake
Assistant Examiner—Siegfried H. Grimm
Attorney—Donald F. Bradley ABSTRACT: A laser is self mode-locked by placing an expander element comprising a saturable absorber which has a faster recovery time than the loop time delay of the laser within the optical cavity of the laser. Acoustic waves may be propagated within the saturable absorber to gate the laser output.

PATENTED NOV 30 1971 3,624,544

INVENTORS
ANTHONY J. DEMARIA
DAVID A. STETSER, JR.
HANS A. HEYNAU

BY Donald J. Bradley
ATTORNEY

SELF MODE-LOCKING OF LASERS USING DYES

This invention relates to lasers, and specifically to the self mode-locking of lasers with saturable absorbers. More particularly, this invention relates to the use of saturable absorbers such as reversible bleachable dyes as expander elements in the optical region of the electromagnetic spectrum.

In another embodiment, a saturable absorber may be simultaneously used as an optical expander and for gating of a laser by propagating acoustic waves within the saturable absorber placed within the laser's Fabry-Perot cavity.

Laser oscillators generally consist of a resonant system with dimensions that are large when compared with the wavelength of oscillation of the laser. As a result mode density is high. The number of axial interferometer resonances across the line width of a laser transition is directly proportional to the optical path length and the line width, and inversely proportional to the square of the center wavelength. For example, the line shape of $Nd^{3+}$ in a glass host is a series of superimposed homogeneously broadened lines yielding an inhomogeneously broadened line of approximately 100 A. in width at a center wavelength of 1.06 microns. With a mirror spacing of 1.5 meters, there exist approximately $3\times10^4$ axial interferometer resonances across the line width.

If the laser is internally amplitude modulated at a frequency equal to some multiple of the axial mode spacing frequency, the axial resonance modes couple with a well-defined amplitude and phase. This phenomenon was first predicted by M. DiDomenico, Jr., J. Appl. Phys. 35, 2870 (1964). Mode-locking of the axial modes of the $Nd^{3+}$ doped-glass laser increases peak power by a factor of $3\times10^4$ : Under such conditions the pulse widths at the half intensity points are approximately $10^{-13}$ seconds at a pulse repetition period as high as $10^{-9}$ seconds. Such narrow-width, high-peak-power, coherent optical pulses have obvious utility in many areas such as high-speed photography, ranging, nonlinear optics, plasma generation and for the generation of narrow-width, high-voltage electrical pulses.

The mode-locking results from the superposition of the upper and lower sidebands of the amplitude-modulated light beam with the resonances of the interferometer. The constructive and destructive interference of the simultaneous phase-locked oscillations is analogous to the interference of Fourier series components in the construction of a repetitive pulse train. The period of the laser's pulsating output is inversely proportional to the modulation frequency, and the peak power of the pulses is equal to the number of axial interferometer resonances times the average power.

This invention relates to the use of saturable absorbers within the path of the laser beam to automatically produce mode-locking without the necessity of adjusting mirror spacing, modulating frequency, laser cavity Q, laser position, or compensating for any perturbations affecting the optical length of the feedback interferometer. The saturable absorber acts as an expander element in a regenerative pulse amplifier, with the laser itself acting as the amplifier, the combination of the Fabry-Perot resonances and line width of the laser transition acting as the filter, and the time required for an optical pulse to traverse twice the distance between the reflectors serves as the loop time delay. This invention specifically points out that any medium absorbing at the laser wavelength will serve as an optical expander element if the relaxation time of the absorber is faster than the loop delay of the laser.

It is also known that a laser beam may be modulated by interacting the laser beam with acoustic waves. Such interaction may produce refraction, diffraction, frequency translation, polarization and focusing. The laser output modulation by acoustic waves may be accomplished by inserting a liquid or solid ultrasonic cell or other acoustic wave propagating medium either within the optical feedback cavity of the laser or external to the laser itself. The use of an ultrasonic cell for modulation by refraction of the laser beam is described and claimed in U.S. Pat. No. 3,566,303. The use of an ultrasonic cell for modulation by diffraction is described and claimed in U.S. Pat. No. 3,297,876 and U.S. Pat. No. 3,517,332.

Acoustic waves may also be focused within the laser medium itself to produce a time-varying refractive index perturbation and a focusing effect on the laser beam as disclosed and claimed in U.S. Pat. No. 3,464,027.

By inserting a cell containing a saturable absorber within the laser cavity or within the path of the laser beam, and thereafter generating an ultrasonic acoustic wave within the absorber intersecting the laser beam, the laser beam will be modulated by the laser-acoustic interaction, and in addition be mode-locked by the saturable absorber whereby a series of gated, high-power, fast rise-time, coherent pulses having extremely narrow pulse widths are obtained. The ultrasonic waves will gate or modulate the laser output at a frequency $\tau 1$ while the saturable absorber will act as an optical expander element and modulate the laser pulses at a frequency $\tau 2$ which is much higher than $\tau 1$. This will result in a group of individual high-peak-power pulses occuring at a repetition frequency of $\tau 2$ and the entire group occuring at a repetition period of $\tau 1$.

It is therefore an object of this invention to provide a novel method and apparatus for producing high-power, short-duration laser pulses.

Another object of this invention is a novel laser system in which a saturable absorber that has a relaxation time faster than the time required for an optical pulse to traverse twice the distance between the laser's reflectors is inserted within the lasers beam path to mode-lock the laser.

A further object of this invention is a novel laser system utilizing a reversible bleachable dye for obtaining mode-locked laser pulse generation.

Another object of this invention is a novel gating method and apparatus for lasers in which a saturable absorber is inserted in the laser beam path and an ultrasonic acoustic wave propagated within the absorber.

These and other objects and a fuller understanding of this invention may be had by referring to the following description and claims, read in conjunction with the accompanying drawings, in which:

Figure 1:
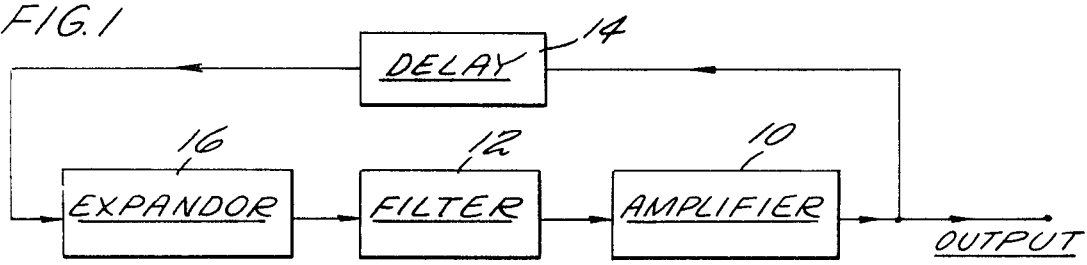
FIG. 1 shows the basic elements of a regenerative pulse generator.

Referring specifically to FIG. 1 there is shown in block diagram form a regenerative pulse generator system as described by Cutler, Proceedings of the IRE, Vol. 43, pp. 140 et seq., Feb. 1955. The FIG. shows a feedback system for generating very short-duration pulses in which a pulse recirculates indefinitely around a feedback loop, at each traversal producing an output. The loop consists of an amplifier 10, a filter 12, a delay line 14 and an expander 16. The precise order of the elements is not important. An automatic gain control circuit (not shown) may be included to limit pulse amplitude to produce unity loop gain and prevent overloading.

The elements of the pulse generator are standard except for the expander, which functions to prevent degradation of the circulating pulse by noise and distortion. The expander emphasizes the highest amplitudes of the recirculating pulse, reduces the lower amplitudes, discriminates against noise and reflections, and acts to shorten the pulse until the length is limited only by the frequency response of the system.

The essential requirement for the expander 16 is that it provides higher gain or less attenuation for a high-level signal than for a low-level one and that its recovery time be shorter than the loop time delay of the system. In electrical systems this characteristic is obtained by operating a conventional grid control tube with the grid biased near or below cutoff, or at microwave frequencies by using a crystal or other nonlinear impedance.

The pulses generated are coherent and are the result of complementary action of a frequency filter and a nonlinear circuit, the characteristic of which can be varied to produce a wide variety of pulse shapes. The pulse rate of the output is equal to the reciprocal of the midband loop delay, the pulse length is determined by the filter bandwidth, and the center frequency is determined by the median filter frequency.

Figure 2:
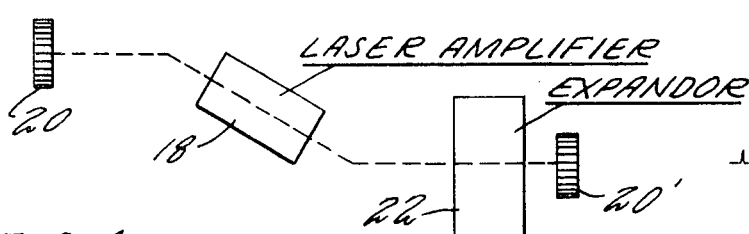
FIG. 2 shows the basic elements for a laser mode-locked with a reversible bleachable dye.

A laser possesses all the basic elements of regenerative pulse generator described above with the exception of the expander element 16. In FIG. 2, which shows schematically the basic elements for a laser pulse generator, the laser medium 18 serves as the amplifier, the combination of the Fabry-Perot resonances and line width of the laser transition serve as the filter, and the time required for an optical pulse to transverse twice the distance between the reflectors 20 and 20', which serve as the Fabry-Perot interferometer, will produce the loop time delay. The pumping source, power supplies and other associated equipment necessary for normal laser operation are well known to those skilled in the art and are not shown.

In the past, the laser was operated as a pulse regenerative oscillator by coupling the optical modes with a time-varying loss, having a frequency commensurate with the axial mode spacing frequency, inserted into the feedback interferometer. See, for example, the DiDomenico reference cited supra. It is also known that the nonlinear gain characteristics of the inverted population of a laser medium can also serve as an expander element if the Q of the laser and the position of the active medium are judiciously adjusted. See for example Crowell, J. Quantum Elec. 1, 12 (1965) and McClure, Appl. Phys. Letters 7, 148 (1965).

This invention relates to the use of any saturable absorbers that have a faster recovery time than the loop time delay of a laser such as reversible bleachable dye solutions commonly used as Q-switches to obtain giant laser pulses, as expander elements in the optical region of the electromagnetic spectrum. An optical saturable absorber is a solid, liquid or gas in which light radiation is selectively absorbed until an equalized population is produced within the absorber and the optical radiation impinging thereon is selectively passed. A criterion of the absorber before it can be used as an expander revealed by this invention is that its recovery time be shorter than the loop time delay of the laser. Typical examples of a saturable absorber are liquid bleachable dyes such as Eastman 9140, and cryptocyamine in methanol or Schott RG8 and RG10 glasses. When used as an expander the dye is contained in an optically transparent enclosure 22 and placed within the Fabry-Perot cavity in the path of the laser beam as shown in FIGS. 2. The laser element 18 is shown at the Brewster angle to lessen optical losses.

The advantages of a bleachable dye expander element arise from its ability to automatically produce mode-locking without the necessity of critically adjusting mirror spacing, modulating frequency, the Q of the cavity, laser position, or compensating for any perturbations affecting the optical length of the feedback interferometer. The latter advantage is of particular importance in the mode-locking of large solid-state lasers as a consequence of the optical length variation of the rods during the optical pumping flash.

Figure 3:
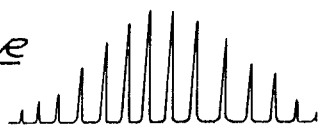
FIG. 3 shows graphically a typical laser output from the apparatus of FIG. 2.

Mode-locking experiments have been performed with reversible bleachable dyes using the experimental setup shown in FIG. 2. A $Nd^{3+}$ doped-glass laser 12.2 cm. long and 0.95 cm. in diameter with its ends polished at Brewster's angle was pulsed through an expander 22 which consisted of Eastman 9740 The overall detection system rise-time was approximately $0.5 \times 10^{-9}$ sec. The output of the laser was simultaneously Q-switched and mode-locked. The recorded pulses were $0.5 \times 10^{-8 \& 9}$ sec. wide and had a repetition period equal to the time required for an optical pulse to traverse twice the distance between the two reflectors 20 and 20'. The output signal is shown in FIG. 3. Signals up to approximately 200 volts peak across 125 ohms were obtained, with pulse widths of approximately $0.5 \times 10^{-9}$ sec. Pulse widths recorded to date are limited by the response time of presently available detector techniques.

There are many applications such as in high-speed photography, optical doppler radar and ranging which require a group of individual high-peak-power pulses occurring at a repetition period of $\tau 1$ c.p.s. and the entire group occurring at a repetition period of $\tau 2$ c.p.s. (See FIG. 6) In the past the optical refraction and diffraction of light of acoustic waves has been used to periodically gate the laser output to obtain pulses at a repetition period of $\tau 2$ with a pulse length of $\tau 3$.

Figure 6:
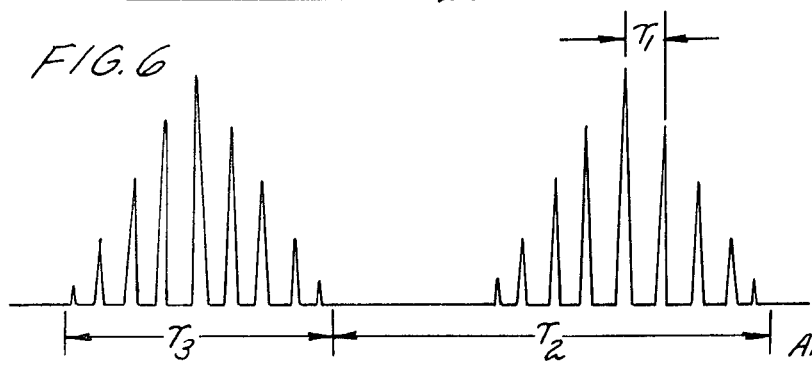
FIG. 6 shows the output of the apparatus of FIGS. 4 and 5.

It has been found that the propagation of acoustic waves in a saturable absorber such as a reversible bleachable dye inserted into the optical feedback cavity of a laser interferometer will produce a series of pulses as shown in FIG. 6, i.e., the ultrasonic waves will gate or modulate the laser output at a frequency $1/\tau 2$ whereas the saturable absorber will act as an optical expandor element and modulates the gated laser pulses at a frequency $1/\tau 1$. The operation of the bleachable dye as an expander element and the manner in which it gates the laser is described supra.

Figure 4:
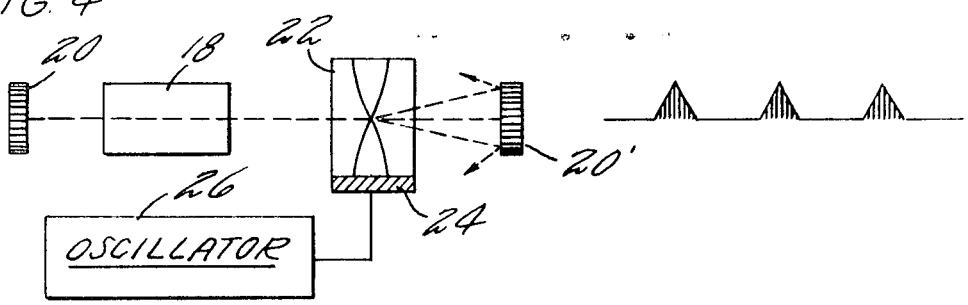
FIGS. 4 and 5 show the arrangement for gating of a laser by the refraction and diffraction of light by acoustic waves propagated within a reversible dye.
Figure 5:
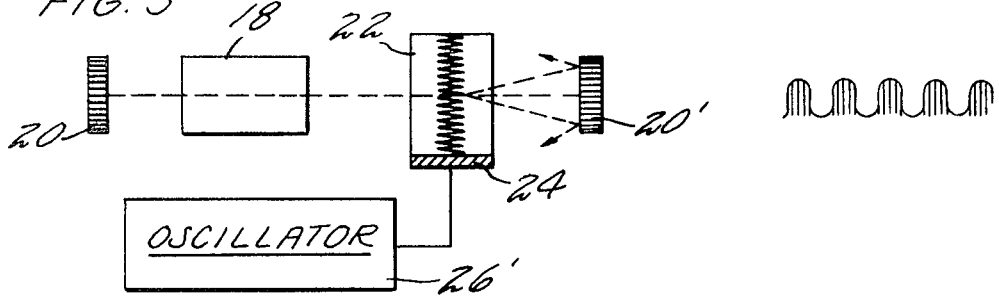

Typical apparatus for the described rf laser gating is shown in FIGS. 4 and 5 in which the laser gating is shown in FIGS. 4 and 5 in which the laser amplifier 18 and mirrors 20 and 20' are similar to FIG. 2. Expander cell 22 is inserted in the laser feedback cavity as previously, and a transducer 24 is bonded or otherwise connected to the expander cell 22 in a manner known to those skilled in the art. The transducer is driven by an oscillator 26 and 26' to generate an ultrasonic-frequency wave in the cell medium. The wave generated is preferably a standing wave.

The ratio of the laser beam width $w$ to acoustic wavelength $\Lambda$ determines whether refraction or diffraction of the laser beam occurs. Generally, when $w/\Lambda << 1$, refraction occurs; when $w/\Lambda << 1$, diffraction predominates.

In FIGS. 4 it is assumed that a low-frequency signal is produced by oscillator 26 in the range of $50 \times 10^3$ to $10^6$ c.p.s. This will produce refraction of the laser beam. In FIG. 5 it is assumed that a high-frequency signal of approximately $10^6$ to $10^8$ c.p.s. is produced by oscillator 26', and diffraction of the laser beam will occur. For a more detailed description of the phenomenon involved, reference may be had to copending U.S. Pat. application Nos. 228,969 and 273,514 described supra.

While this invention has been described with reference to a preferred embodiment, it is obvious that numerous changes may be made by those skilled in the art without departing from the scope of the invention as hereinafter claimed.

We claim:

1. Apparatus for generating very short-duration optical pulses comprising
   means for generating an optical beam including a laser amplifier having end reflectors, said reflectors being spaced to define an optical feedback cavity therebetween,
   a saturable absorber expander element comprising a cell containing a reversible bleachable dye positioned within said optical feedback cavity in the path of said feedback radiation, said saturable absorber being absorbing at the wavelength of said optical radiation and having a recovery time which is shorter than the time required for an optical pulse to traverse twice the distance between said end reflectors,
   means for generating an oscillating signal,
   a transducer connected with said cell,
   and means for applying said oscillating signal to said transducer to generate an acoustic wave within said cell which intersects said feedback radiation.

2. Apparatus as in claim 1 in which the ratio between the optical beam width and the wavelength of the acoustic wave is greater than unity whereby said optical beam is diffracted upon passage through said cell.

3. Apparatus as in claim 9 in which the ratio between the optical beam width and the wavelength of the acoustic wave is less than unity whereby said optical beam is refracted upon passage through said cell.

4. Apparatus for simultaneously modulating and mode-locking a laser comprising means for generating a laser beam including a laser amplifier having at least two end reflectors, one of said reflectors being spaced from said laser amplifier, said reflectors defining an optical cavity, a cell transparent to said laser beam positioned between said laser amplifier and said spaced reflector, said cell containing a saturable absorber medium, a transducer connected with said cell, means for generating an ultrasonic signal, and means for connecting said signal to actuate said transducer whereby ultrasonic acoustic waves are generated within said medium.

5. Apparatus as in claim 4 wherein said saturable absorber is a reversible bleachable dye.

* * * * *

PO-1050
(5/69)

UNITED STATES PATENT OFFICE
CERTIFICATE OF CORRECTION

Patent No. 3,624,544              Dated   November 30, 1971

Inventor(s) A. J. DeMaria, D. A. Stetser, Jr., H. A. Heynau

It is certified that error appears in the above-identified patent and that said Letters Patent are hereby corrected as shown below:

Claim 3, column 4, line 70, "claim 9" should read -- claim 1 --

Signed and sealed this 25th day of April 1972.

(SEAL)
Attest:

EDWARD M. FLETCHER, JR.                ROBERT GOTTSCHALK
Attesting Officer                      Commissioner of Patents